US010175055B2

(12) United States Patent
Mayrhofer et al.

(10) Patent No.: US 10,175,055 B2
(45) Date of Patent: Jan. 8, 2019

(54) NAVIGATION SYSTEM

(71) Applicants: Thomas Mayrhofer, Fürth (DE); Florian Bartels, Nürnberg (DE); Heinz Grotter, Nürnberg (DE)

(72) Inventors: Thomas Mayrhofer, Fürth (DE); Florian Bartels, Nürnberg (DE); Heinz Grotter, Nürnberg (DE)

(73) Assignee: ELEKTROBIT AUTOMOTIVE GmbH (DE)

( * ) Notice: Subject to any disclaimer, the term of this patent is extended or adjusted under 35 U.S.C. 154(b) by 15 days.

(21) Appl. No.: 14/955,747

(22) Filed: Dec. 1, 2015

(65) Prior Publication Data

US 2016/0223346 A1 Aug. 4, 2016

(30) Foreign Application Priority Data

Dec. 3, 2014 (DE) .......................... 10 2014 224 810

(51) Int. Cl.
G01C 21/34 (2006.01)
H04N 7/18 (2006.01)
G01C 21/36 (2006.01)

(52) U.S. Cl.
CPC ......... *G01C 21/34* (2013.01); *G01C 21/3641* (2013.01); *H04N 7/18* (2013.01)

(58) Field of Classification Search
CPC ....... G01C 21/34; G01C 21/3641; H04N 7/18
See application file for complete search history.

(56) References Cited

U.S. PATENT DOCUMENTS

2009/0125235 A1* 5/2009 Chen ...................... G01C 21/32
701/414
2012/0218412 A1* 8/2012 Dellantoni ......... G01C 21/3602
348/148

(Continued)

FOREIGN PATENT DOCUMENTS

DE 693 23 355 T2 8/1999
DE 10 2007 044 955 A1 4/2009

(Continued)

OTHER PUBLICATIONS

Office Action for Application No. JP 2015-234543 dated Nov. 10, 2016.

*Primary Examiner* — Alan D Hutchinson
(74) *Attorney, Agent, or Firm* — Tarolli, Sundheim, Covell & Tummino LLP

(57) ABSTRACT

The invention relates to a navigation method and to a navigation device. In the navigation method, the actual movement of the navigation device and thus of the user of the navigation device is detected. In order for a prescribed destination to be reached, navigation instructions are output by the navigation device. Signals that reflect the actual geometry of the surroundings can be transmitted to the navigation device by a device for detecting the surroundings. If it is recognized that output navigation instructions have not been followed, then the signals that reflect the geometry of the surroundings are detected. Based on the difference between the actual movement and the movement prescribed by the instructions, alternative navigation instructions are determined. In comparison to the originally suggested navigation instructions, the alternative navigation instructions constitute a confirmation in the direction of movement suggested by the original navigation instructions.

13 Claims, 9 Drawing Sheets

(56) References Cited

U.S. PATENT DOCUMENTS

Figure 1A:
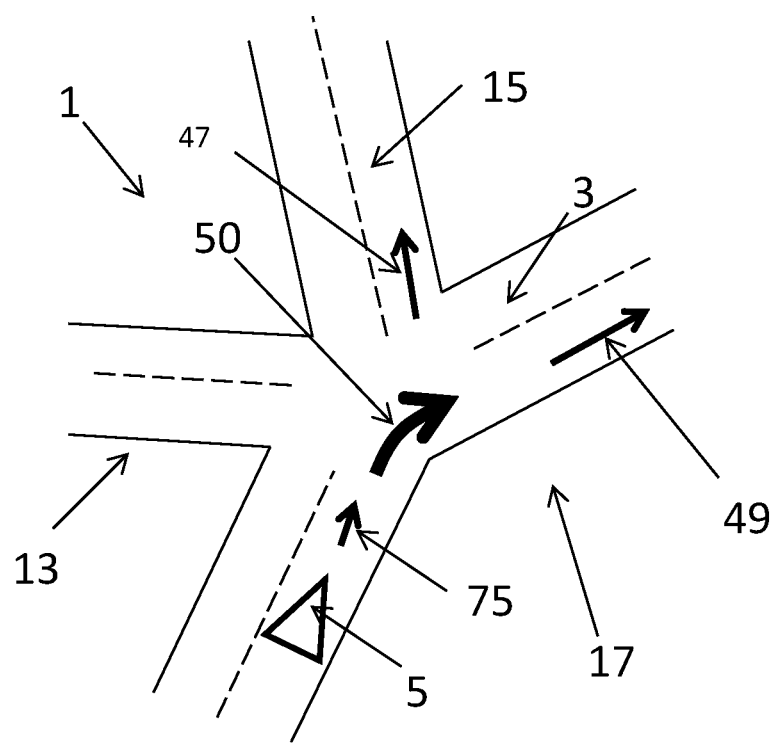

| | | | | |
|---|---|---|---|---|
| 2014/0214322 A1* | 7/2014 | Tsimhoni | ............... | G01C 21/34 |
| | | | | 701/534 |
| 2015/0276421 A1* | 10/2015 | Beaurepaire | .......... | H04W 4/027 |
| | | | | 701/400 |
| 2015/0345960 A1* | 12/2015 | Bennah | .................. | G01C 21/34 |
| | | | | 701/468 |
| 2015/0379360 A1* | 12/2015 | Rhee | .................. | G01C 21/3644 |
| | | | | 345/633 |

FOREIGN PATENT DOCUMENTS

| | | |
|---|---|---|
| DE | 20 2007 018 604 U1 | 4/2009 |
| DE | 102007061706 A1 | 7/2009 |
| DE | 102009019610 A1 | 11/2010 |
| DE | 102009046676 A1 | 5/2011 |
| DE | 102012013376 A1 | 1/2014 |
| DE | 10 2012 220 158 A1 | 5/2014 |
| JP | 2001-336941 A | 12/2001 |
| JP | 2011-044109 A | 3/2011 |
| JP | 2011-220838 A | 11/2011 |

* cited by examiner

NAVIGATION SYSTEM

The invention relates to a navigation system. The navigation system uses digital map material in order to calculate routes and, on that basis, to generate instructions. Instructions are also referred to as maneuvers, navigation commands, driving instructions, navigation directions or the like. On the basis of the generated instructions, the user is guided on a route that was calculated ahead of time.

Below, the terms "maneuvers, navigation commands, driving instructions, and navigation directions" are used synonymously. In particular, the navigation system can be utilized by users, whereby the term "user" is to be interpreted in the broadest sense possible and encompasses, for example, the drivers of motor-driven or human-powered vehicles as well as pedestrians.

The map material employed is a model/image of reality. Navigation commands are generated on the basis of this image. In order to generate the navigation commands, geometries are ascertained and used on the basis of map material. In some cases, the geometry used can lead to a situation in which the generated navigation command does not match the anticipated navigation command or it is not unambiguous for the user, thus confusing the user. The result can be an unwanted deviation from the calculated route. This deviation is also referred to as an instance of the driver's going the wrong way.

German patent application DE 10 2007 044 955 A1 discloses a navigation system with a display unit and with a camera system for detecting the surroundings. Image data generated by the camera system and at least an indication of the course of the travel route are shown in the display device superimposed on each other. This is intended to minimize any misinterpretation of instructions.

German utility model DE 20 2007 018 604 U1 describes a navigation device in which image data is continuously captured by a camera. The image data captured by the camera is analyzed to see whether the image data contains one or more recognizable predefined features. In this manner, traffic signs or traffic lights, also referred to as stop lights, can be recognized. These recognized predefined features are stored together with the GPS position data. These features, which are associated with position data, serve to improve the map files of the navigation system. These improvements of the map files can be collected in a server and a correction can be made to the map files that are made available to all of the users. Thanks to this method, a changed type of intersection, for example, an intersection that was converted into a traffic circle, can be recognized. German patent application DE 10 2012 220 158 A1 also discloses a traffic sign recognition system for improving map material.

The translation of a European patent DE 693 23 355 T2 discloses a navigation system for a motor vehicle in which the curves in the road are also taken into account. Here, a curve in the road is especially taken into account in the vicinity of a junction. No audio instructions are given when the vehicle is following a route along a curved road. This prevents audio instructions from being given that the driver perceives as being unnecessary and confusing. In order to evaluate whether or not audio instructions have to be given, the road widths and the merging angle data are taken into account on the basis of the map material in the vicinity of the junction of the merged roads.

Aside from the above-mentioned risks of confusing the user and of his/her going the wrong way, another problem is that the map material might be inaccurate. The selection of a navigation command is also difficult in cases of complex geometries. Thus, for example, a junction where the road is curved in the vicinity of an intersection/junction is a complex geometry. Thus, navigation instructions, for example, to drive straight ahead, can be interpreted differently by different users, depending on the actual geometry of the surroundings. As a result, it can happen that the user of the navigation device does not follow the route prescribed by the navigation command. The user of the navigation device will then have deviated from the prescribed route, so that a revised route has to be calculated by the navigation device so that the prescribed destination can be reached.

The invention is based on the objective of putting forward a navigation method and a navigation device with improved navigation commands, also referred to as driving instructions, navigation directions, instructions, or maneuvers.

A refinement of the invention is based on the objective of adapting the instructions given to the user.

Moreover, it is the objective of a refinement of the invention that the improved instructions are subsequently taken into account in the navigation method and by the navigation system, without a need for the software or the map material to be replaced.

This objective is achieved by a navigation system in which the signals that reflect the geometry of the surroundings are detected, at least in case of a deviation from the prescribed movement.

It can also be provided that the signals that detect the geometry of the surroundings are continuously detected or that the signals that reflect the geometry of the surroundings are always detected once instructions are given before a junction or before every junction.

Non-compliance with instructions is considered to be present in any case whenever the user of the navigation system makes a movement that does not match the movement prescribed by the route and/or by the instructions and, as a result, a new route has to be calculated so that the prescribed destination can be reached.

The term "junction" refers to a geometry in which there are various possibilities for a continuation of the travel. A junction is, for example, a traffic circle or an intersection.

If, within the scope of the navigation method, it is ascertained that the vehicle movement prescribed by the instructions deviates from the actually detected movement, then alternative instructions are determined that, in comparison to the originally provided instructions, comprise a correction or else a confirmation in the direction of movement suggested by the original instructions. The correction can also involve the omission or addition of instructions.

In this manner, the navigation method is adapted to the actual geometry of the surroundings. With this navigation method, it is also possible to adapt the instructions to the user. It is precisely the subjective perception of the user of the navigation method that can be the determining factor in causing the user not to follow the movement that was suggested by the instructions provided. By using the alternative instructions, it can be achieved that the user follows the originally suggested instructions when he or she passes the junction with the alternative instructions.

In an advantageous refinement of the navigation method according to the invention, it is provided that the position data for this geometry of the surroundings is determined. The position data can be determined, for instance, on the basis of GPS data. The navigation method can provide that, by associating the position data, the alternative instructions are stored. The alternative instructions can be stored in a memory of the navigation system being utilized by the user.

In this case, this is also referred to as a local storage of the alternative instructions. However, it can also be provided that the alternative instructions are transmitted to a central server and stored there. As a result, these alternative instructions can be made available to numerous users. It can also be provided that instructions stored in a central server are checked to see whether certain alternative instructions for a certain place have been stored multiple times, and if so, then these alternative instructions are declared to be the instructions to be given by the navigation method as the instructions at this place. For example, the alternative instructions are stored as instructions for all of the users if, for the same given place, the same alternative instructions have been ascertained by at least 60% of the users, preferably by more than 75% of the users.

In an advantageous embodiment of the navigation method, it is provided that the determined alternative instructions are used for all comparable surrounding geometries. As a result, it can be achieved that the user of the navigation method does not first have to go the wrong way in each comparable surrounding geometry before being offered alternative instructions in the future for the suggested route in a manner that is understandable to this user. As a result, a navigation method is provided that is specially individualized for a given user. Through a log-in when the navigation method or navigation device is started up or through automatic recognition of the driver by the vehicle, access to the individualized instructions relating to this user can be ensured. By following the instructions, the user is led along the suggested route.

In a refinement of the navigation method, it is provided that, at the time of the next use of the stored alternative instructions, a checking procedure is carried out to see whether the alternative instructions have been followed, and if the alternative instructions have not been followed, then the originally stored instructions are retained or else different alternative instructions are stored as the second alternative instructions as a function of the recognized actual geometry of the surroundings. In this manner, unambiguous instructions for the user of the navigation device or of the navigation method can be discovered and stored in the form of an iterative method. In particular, the determination of other alternative instructions can be provided for when the junction permits at least three possibilities of continuation of the travel.

In a refinement of the navigation method, it is provided that a camera facing in the direction of movement is provided as the device for detecting the surroundings, and it is used to capture image data and to transmit this to the navigation device. Thanks to the camera images in the navigation direction, it is possible to detect the viewing angle and the image of the surroundings being offered to the user, so that this can be taken into account when the alternative instructions are selected. As a result, the actual appearance of the geometry of the surroundings that is given to the user can be taken into account during the determination of the alternative instructions. The presence, for example, of trees or large buildings can conceal branching-off roads, as a result of which the user does not follow the suggested movement on the basis of the command that has been given. Moreover, instructions can seem confusing, simply because of the subjective appearance of the geometry of the surroundings. In this context, it can be provided that the instructions are checked on the basis of the captured image data. It can be provided that this checking is carried out centrally on a server to which the data is transmitted.

In the navigation method, it has proven to be advantageous to detect image data that has been captured from a backward-facing perspective. This image data can be captured by another camera that is oriented in the backward-facing direction. It can also be provided to swivel the camera that is used to capture the image data in the direction of movement. It can also be provided that the camera used in park assist systems and that faces backwards can be controlled and then used to capture image data in the backward direction.

In one embodiment, it is provided that the image data in the direction of movement is captured when the instructions are given for the first time and that, preferably at the junction, image data is captured in the direction of movement and that preferably, after the junction has been passed, the image data is then captured opposite to the direction of movement.

In a refinement of the navigation method, it is provided that the detected actual geometry of the surroundings is compared to a geometry of the surroundings that serves as the basis of the navigation method and, if there is a deviation, the actual geometry of the surroundings is stored in the navigation device or is taken as the basis in the navigation method. As a result, the map data used in the navigation method can be constantly updated. It can be provided that such adaptations or modified information and/or raw data such as, for instance, images, map geometry or GPS tracking, are transmitted to a central server. The central server can recognize the deviations and can correct them. In the central server, map material can be updated on the basis of this data. The updated map material or the update data can be made available to other users of the navigation method. Such data transmissions can be done wirelessly.

In one embodiment, it is provided that a checking procedure is carried out relating to the geometry of the surroundings that served as the basis of the instructions and that is based on the map material used by the navigation device as well as on the acquired actual geometry of the surroundings. If the acquired geometry of the surroundings matches the geometry of the surroundings contained in the map material, then the alternative instructions are stored in the navigation device. This ensures that the deviation between the actual movement and the suggested movement is not based on a change in the geometry of the surroundings.

In one embodiment, the checking procedure pertaining to the geometry of the surroundings used as the basis for the instructions is carried out in the navigation device itself.

As an alternative, the checking procedure pertaining to the geometry of the surroundings used as the basis for the instructions, the recognition and the determination of the instructions and/or the data management can all be carried out in a central server.

The invention also relates to a navigation device comprising a camera for capturing image data in the direction of movement as well as a control unit in which the map material is stored. The control unit also controls the output of navigation commands. Moreover, the control unit processes the image data that has been made available, and it also has a memory in which instructions are stored. A module, which can be a component of the control unit, is associated with this memory. This module captures the alternative instructions that have been determined according to claim 1 and stores them for further use.

In an advantageous embodiment of the navigation device, it is provided that the navigation device has a camera facing in the direction of movement and a camera facing opposite to the direction of movement.

Generally speaking, the invention makes it possible to improve the instructions that are supplied with a version of a navigation method or a navigation device without having to replace the software and/or the map material.

Below, embodiments of the invention are described with reference to the figures. The embodiments can contain autonomous inventive aspects, whereby the invention is not to be construed as being limited to the embodiments.

Figure 1B:
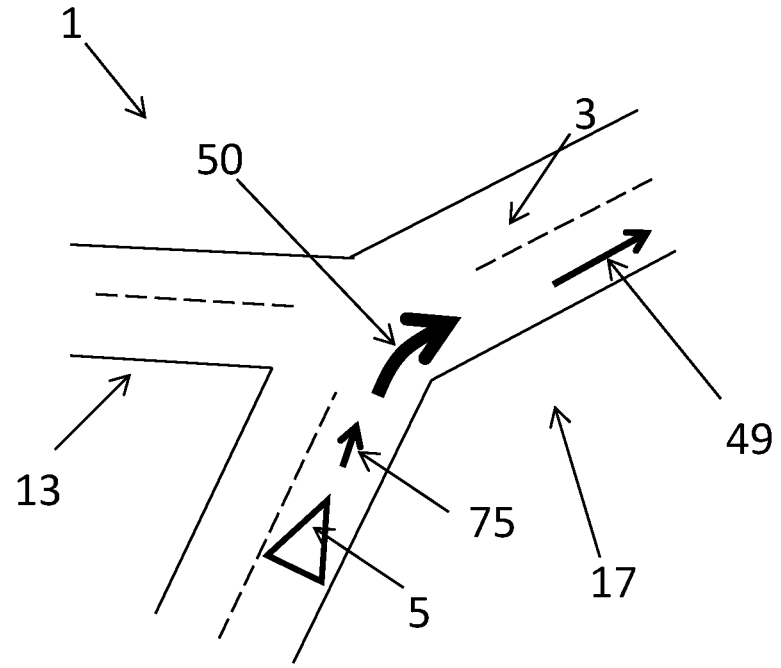
Figure 2:
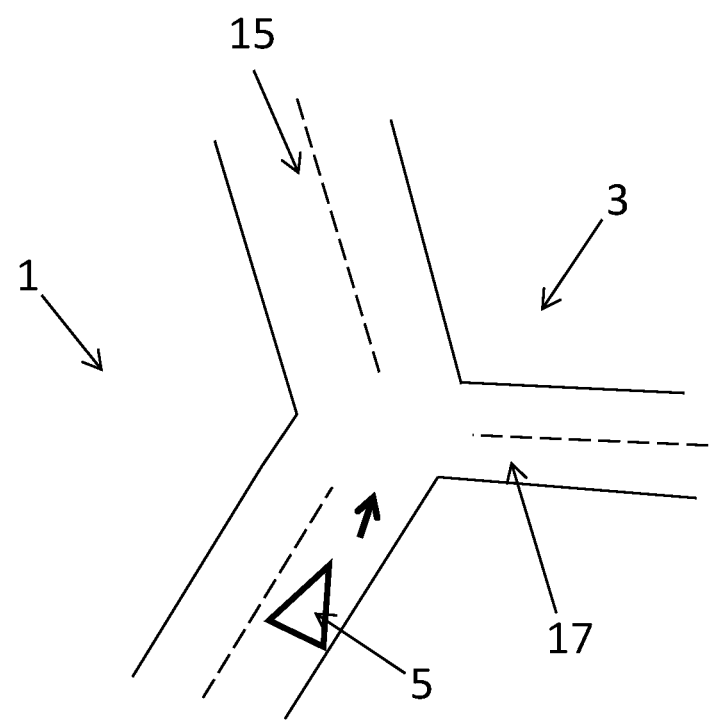
Figure 3:
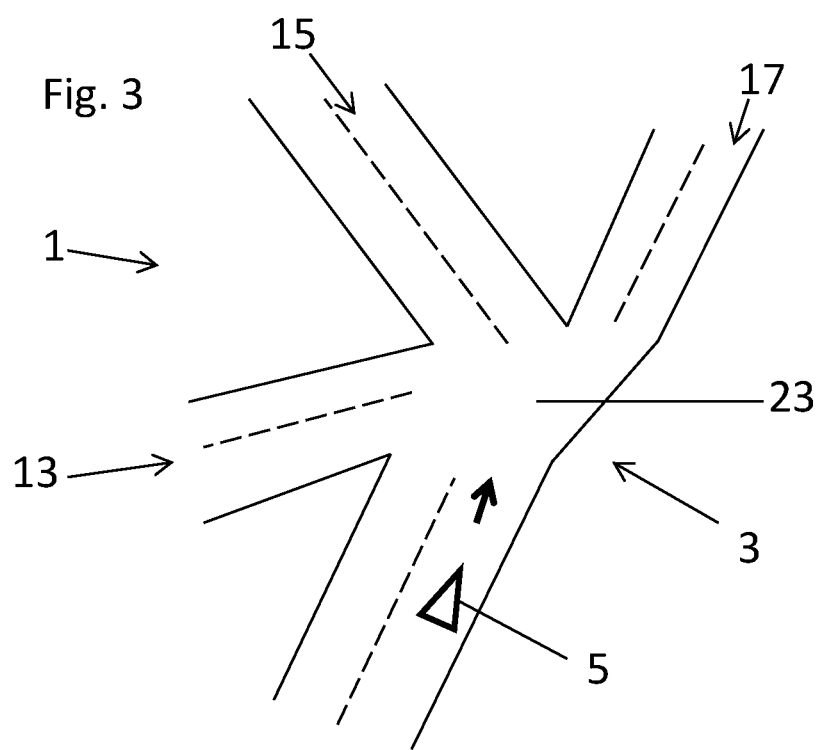

The following is shown:

FIG. 1a: intersection as a junction with driving lanes arranged at an angle to the intersection street;

FIG. 1b: intersection as a junction with driving lanes arranged at an angle to the intersection street, as stored in the map material;

FIG. 2: intersection as a junction with two alternatives;

FIG. 3: complex geometry of the surroundings/junction

Figure 4:
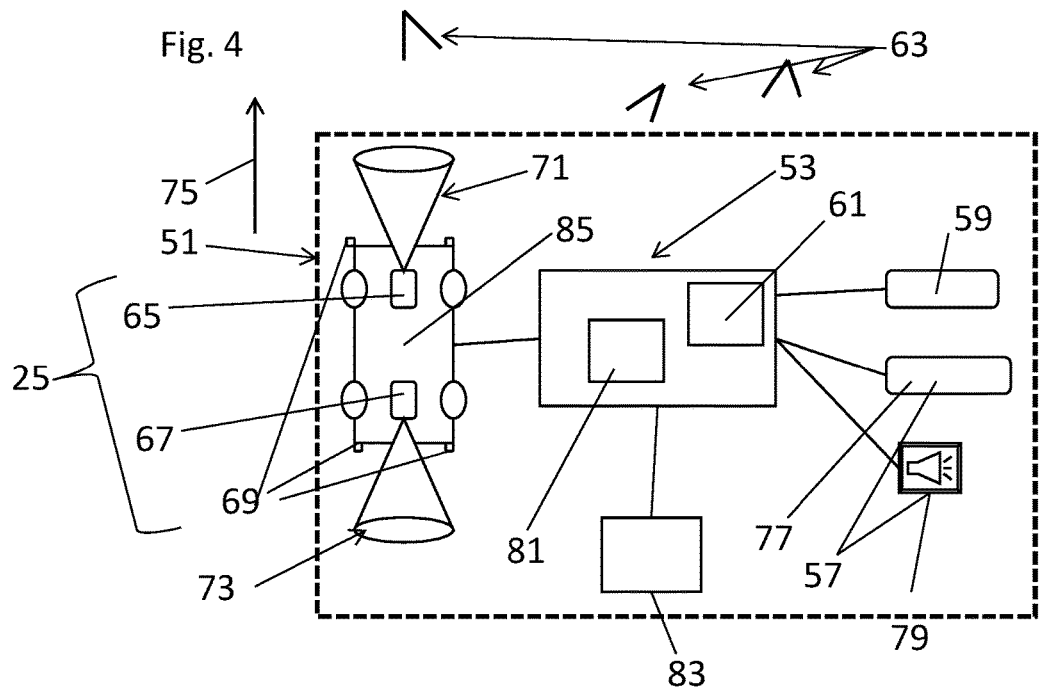

FIG. 4: navigation system

Figure 5:
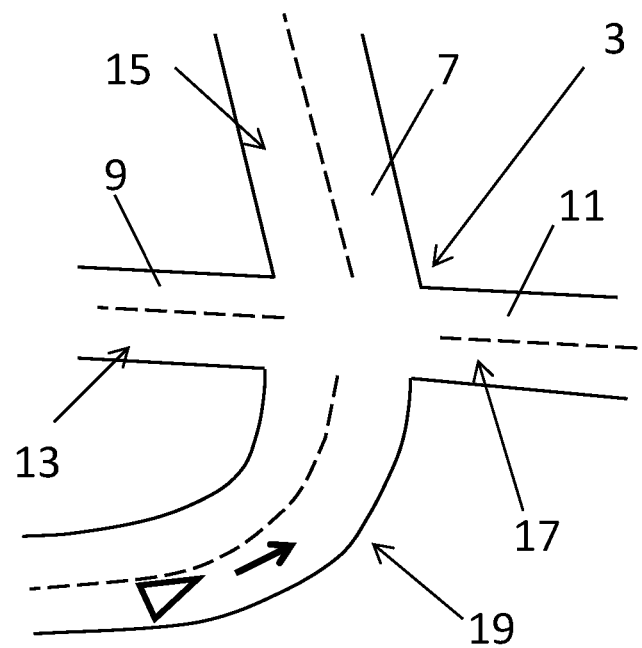
Figure 6:
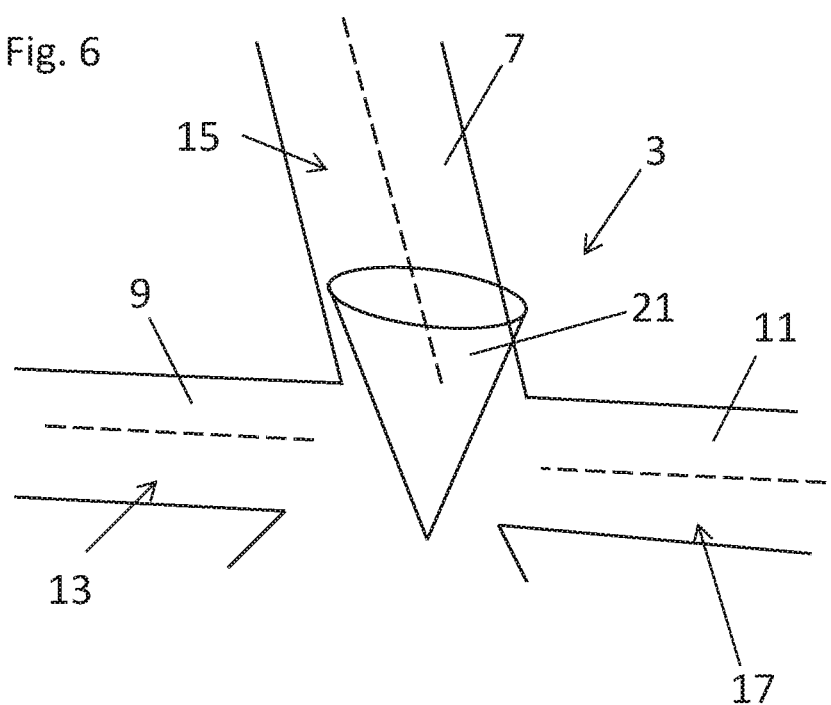
Figure 7:
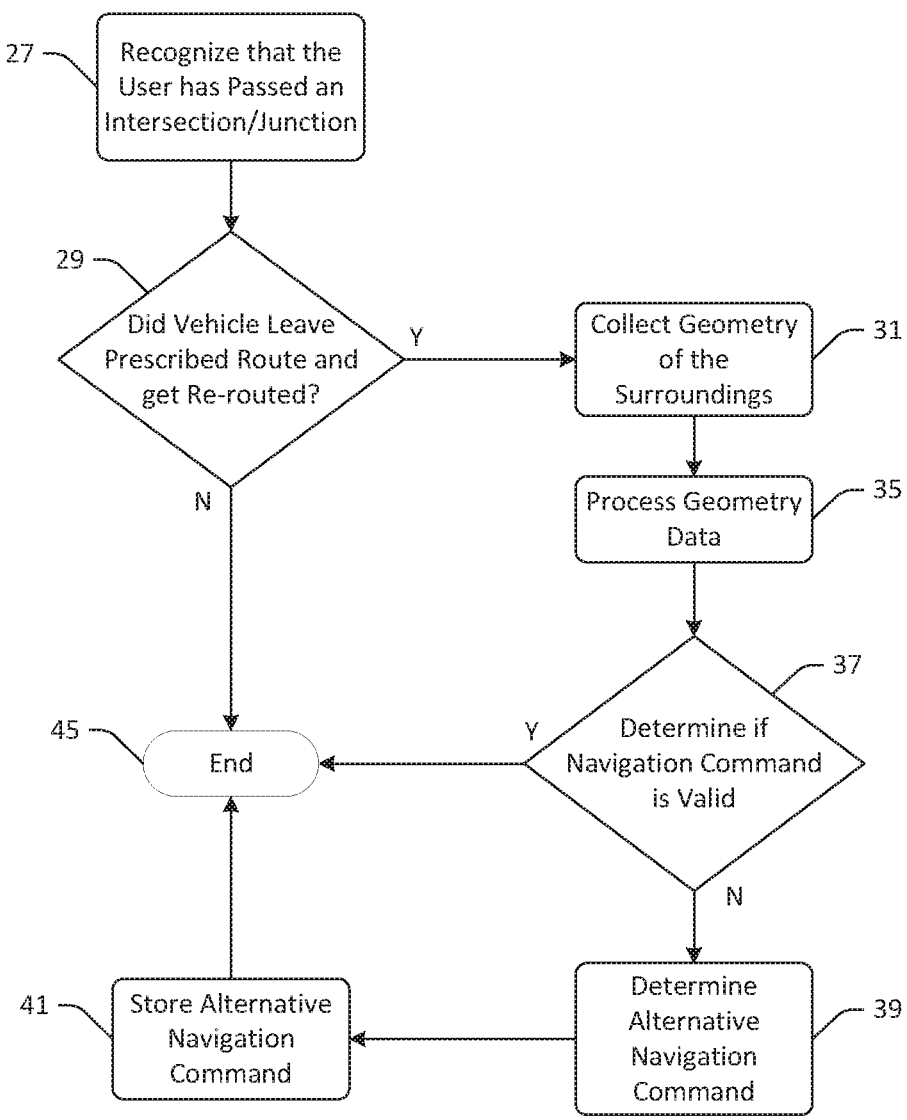
Figure 8:
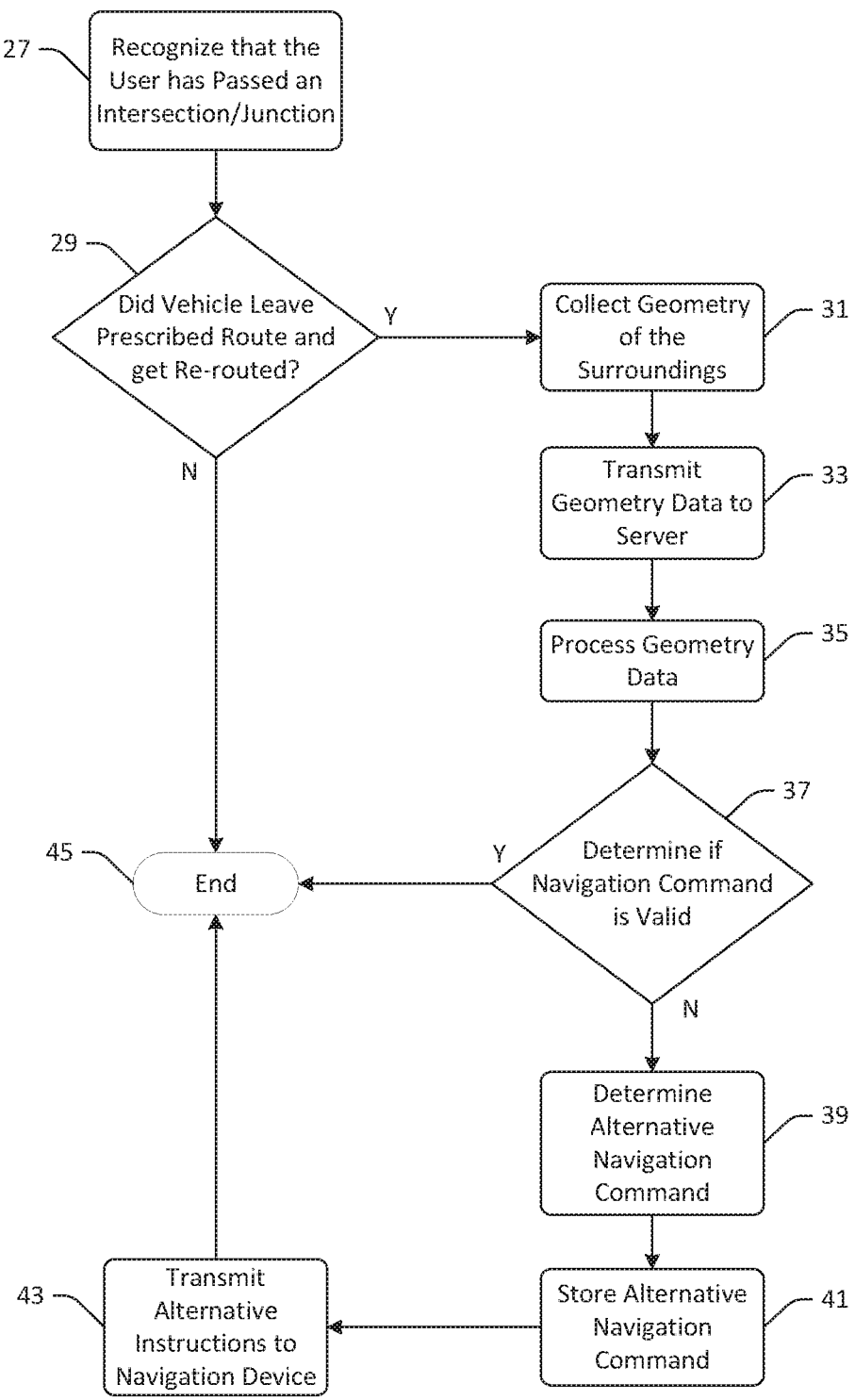

FIG. 5: intersection as a junction with a curved access road;

FIG. 6: depiction of the viewing angle in the intersection area;

FIG. 7: flow chart of the method sequence for user-specific use;

FIG. 8: flow chart of the method sequence with a central server application.

Below, the invention will be explained in greater detail on the basis of the embodiments shown schematically in the figures.

First of all, the navigation device 51 is described with reference to FIG. 4. The navigation device 51 has a control unit 53. This control unit 53 is equipped with a position detection means 61 with which the movement of the navigation device 51 and thus the actual movement are also determined. The direction of movement is indicated by the arrow 75.

In the present case, a GPS receiver 61 is provided that receives signals from GPS satellites 63. An entry unit 59 is provided so that a destination can be entered, and an output unit 57 in the form of a loudspeaker 79 and of a display 77 is provided with which navigation commands can be output. Moreover, the control unit 53 contains stored map material 81. A module 83 for storing alternative navigation commands is associated with the control unit. This module 83 can also be integrated into the control unit 53. Moreover, the signals that characterize the geometry of the surroundings are fed to the control unit 53. A vehicle 85 is shown that has a first forward-facing camera 65 for recording image data in the straight-ahead direction, and a second backward-facing camera 67 for recording image data opposite to the direction of movement. The image area covered by the cameras is indicated by cones 71, 73. Another sensor system 69 is additionally provided to assist with the detection of the surroundings. In the present case, the two cameras 65 and 67 and the sensor system make up the device 25 for detecting the surroundings.

FIG. 1a shows an intersection 3 that is also referred to as a junction 3. This junction 3 has a first alternative 13, a second alternative 15 and a third alternative 17 for the further continuation of the travel. The user 5 of the navigation device 51 is in another driving lane. The direction of movement is indicated by an arrow 75.

FIG. 1b shows the same intersection 3 as it is stored in the map material of the navigation device 51. The alternative 15 is not stored in the map material.

The navigation device 51 outputs the navigation command "drive straight ahead". Instead, the user follows the second alternative 15 shown in FIG. 1a. The actual movement 47 is recognized by the navigation device 51. According to the route prescribed by the navigation device 51, with the command "drive straight ahead", the user was supposed to follow alternative 17, that is to say, to turn right. This originally suggested movement is marked with the arrow 49. Due to the difference between the ascertained movement and the movement suggested by the original navigation command, the alternative navigation command 50 "turn right" is determined by the navigation device. The alternative navigation command, here "turn right", is confirmed in the direction of the originally suggested movement 49 on the basis of the route determined by the navigation device 51.

FIG. 2 shows a modification of the junction 3, in which the first alternative 13 has been eliminated. In the modification shown in FIG. 2, the navigation instructions "turn right" and "turn left" can be perceived by the user as being unambiguous. Consequently, "turn left" is used for suggesting the second alternative 15, and "turn right" is used for the third alternative 17. If the geometry of the surroundings has changed in that a new lane has been added, then the user can end up with a completely different picture and, if the second alternative 15 is suggested (see FIG. 1), then he or she perceives a navigation command "drive straight ahead" to be appropriate and unambiguous, even though the second alternative 15 has remained unchanged. However, if "drive straight ahead" were to be used for a geometry of the surroundings according to FIG. 2, it can be assumed that the user will be confused.

FIG. 3 shows a particularly complex junction by way of an example. It can be expected that, if the command "drive straight ahead" were given for a route leading to the third alternative 17, some of the users would take the correct route.

In such a situation, some of the users will follow the third alternative 17 only if they are given the navigation command "turn right". With such surrounding geometries, it is advantageous to use the navigation instructions with which the user has followed the prescribed route. It can be provided that, in the case of such complex and ambiguous junctions, such navigation instructions are stored only with the user (client).

The example depicted in FIG. 5 shows a junction 3 in which the user of the navigation device 51 is traveling on a curved lane 19. Before the junction 3, the driver receives the navigation command that he or she should drive straight ahead at the junction 3. The driver follows alternative 15. The navigation method, however, intended continued travel on the third alternative 17. Consequently, the user did not follow the intended route. Rerouting becomes necessary, that is to say, a new route to the specified destination is calculated by the navigation device 51. At the latest now, it will have been realized that the navigation command has not been followed. Taking the actual detected geometry of the surroundings into account, the navigation method determines an alternative navigation command. The next time this intersection 3 is passed when the driver is coming from the curved lane and with the suggestion of the third alternative 17, the alternative navigation command, here "turn right", is output by the navigation device. The movement then executed matches the specified or given movement. The alternative navigation command is output as the navigation command for the instructions at this junction 3, starting from the curved lane, in order to suggest the third alternative 17.

It can be provided that the navigation method will use these alternative navigation instructions as the navigation instructions in the future for all intersections that have a curved lane with a curvature in the same direction and a comparable arrangement of the alternatives 13, 15, 17.

Moreover, it can be provided for this determined alternative navigation command to be transmitted to a central server from where these alternative navigation instructions can also be made available to other users of the navigation method.

There is an approach that is exclusively implemented in the client. In this context, the client is the navigation device utilized by the user. This is a local application. In an alternative approach, it is provided for the processing steps to be executed on a central server. The advantage of the execution on a server can be seen to lie in the larger computing capacities of the server and in the fact that determined alternative navigation commands pertaining to several users are present on one server and can be evaluated directly. An accumulation of numerous instances of one particular determination of alternative navigation commands for the same junction signifies that the geometry of the intersection has changed. This can also be a temporary construction site. This change can be immediately ascertained by the detection of the geometry of the surroundings followed by a comparison with the stored map material, and this can subsequently be made available to other users. With the server-based approach, all of the users access the same data, and a change made to a stored navigation command, which was defined by determining alternative navigation commands, is immediately available to all of the users. Moreover, a deviation between the stored geometry of the surroundings and the actual geometry of the surroundings can be immediately made available to all of the users.

A client solution is an easy way to provide a navigation method that is individually adapted to a given user. Different users respond differently to navigation instructions. In particular, if one looks at FIG. 2, then the navigation command to drive straight ahead on the second alternative 15 might be suitable for some users, whereas it might lead to confusion on the part of other users. Some of the users perceive following the lane marked as the second alternative 15 as "turning left". Once it has been realized that the navigation command for "drive straight ahead" was not followed, then "turn left" can be defined as the alternative navigation command. When the intersection 3 is passed once again, if the route of the second alternative 15 with the alternative navigation command is being followed, then this alternative navigation command can be considered to have been verified and it can be stored in the navigation method and in the navigation device as a navigation command and no longer as an alternative navigation command.

FIG. 7 shows a flow chart relating to an implementation at the client. The passing of an intersection or junction 3 is recognized, Method Step 27. This is followed by a checking procedure to see whether the vehicle left the prescribed route and whether a new route was determined by the navigation method in order to guide the user to the intended destination, Method Step 29. If no rerouting has taken place, then the evaluation is terminated, Method Step 45. If a rerouting has taken place, then data is collected in a subsequent method step. This data comprises the signals that characterize the geometry of the surroundings, Method Step 31. This data is processed, Method Step 35, and it is determined whether the navigation command is valid, Method Step 37. This is especially the case if no alternative navigation command can be determined. Moreover, this can be the case if the geometry of the surroundings has changed and if it is necessary to adapt the geometry of the surroundings in the map data of the navigation device. If the navigation command is valid, then the procedure continues with Method Step 45 and the evaluation is completed. If it is ascertained that the navigation command is no longer valid, then the procedure continues with Method Step 39. In the Method Step 39, an alternative navigation command is determined. This alternative navigation command is stored, Method Step 41. After the alternative navigation command has been stored, the evaluation is completed in Method Step 45.

A possible approach is also to only carry out the evaluation if a rerouting has taken place at an intersection 3. It would also be possible to evaluate the maneuver data for all of the passed intersections. However, this would presuppose a far more powerful system. In view of the systems available nowadays, this would require a server-based solution.

The following data is collected in order to ascertain whether the maneuver was correct:

Multiple pictures from the camera in the driving direction that were taken at various distances before the maneuver.

Preferably, a first picture that constitutes the capture of image data was taken at the point in time when the navigation command was output.

With a junction according to FIGS. 5 and 6, it was recognized on the basis of the first pictures how many alternatives 13, 15, 17 there are which the user can chose to follow.

It can be provided that only one picture is taken at the first point in time when the navigation command was output or else that one picture is taken every time navigation commands are output before a junction.

On the basis of a second picture just before the intersection 3, an analysis is carried out to check that the same alternatives 13, 15, 17 as had been recognized before exist. It could be the case that, due to the geometry of the surroundings, not all of the alternatives were visible yet from the greater distance. On the basis of this second picture just before the intersection 3, an additional analysis is carried out to check how the user perceives the directions. For this purpose, it is ascertained which direction along the viewing angle 21 is perceived to be straight ahead 7, as shown in FIGS. 5 and 6. This one becomes "drive straight ahead". Accordingly, the streets to the left 9 and to the right 11 are recognized as corresponding to "turn left" and "turn right".

Another picture is taken at a maneuver point 23, as illustrated in FIG. 3. Moreover, it can also be provided for pictures to be taken in-between, without a navigation command being output.

A picture is taken by the reverse camera after the intersection 3 has been passed. Based on information from the four pictures, it is recognized that the intersection 3 has three driving possibilities. While the driver passes the intersection 3, it is recognized that the street that he or she is following lies in the viewing angle for straight ahead and that there is one street to the left and one street to the right of the driver. The information from the individual pictures are not contradictory and they allow the same conclusions.

Based on the positioning and on the map material, it is recognized which street the user has driven. The recognized data from the pictures, namely, one street to the left and one street to the right of the route that the user has driven, is likewise present in the map material.

On the basis of the information that the route to be followed was the street on the right-hand side, the next time the intersection 3 is passed, according to FIG. 1, a navigation command "turn right" is generated instead of a navigation command "drive straight ahead" for the intersection 3.

When the intersection 3 is passed in the future, a checking procedure is carried out to see whether the driver no longer goes the wrong way owing to the navigation command "turn right".

Moreover, it can be provided for speed information acquired from the navigation system and during the navigation method to also be taken into account. Furthermore, it can also be provided that information about the turning position of the steering wheel is taken into consideration in order to obtain information about the turning angle. In particular, the turning position of the steering wheel, a reduced movement/driving speed as well as an activated turn signal to announce the intention to make a turn can all be seen as an indication as to whether or not a navigation command will be followed. These possibilities are variations of embodiments.

FIG. 8 shows the method sequence of a server-based embodiment. In contrast to the user-based version (client version), in Method Step 33, the collected data is transmitted to a server after Method Step 31. The other method steps correspond to the user-based version, but are carried out on the server. After Method Step 39, namely, the determination of an alternative navigation command, the server-based version provides that the alternative navigation command is stored in a memory, Method Step 41. In a subsequent method step, it is provided that the determined alternative instructions are transmitted to the navigation device of the user, Method Step 43.

With the server-based solution, there is still the possibility to use not only data from one vehicle but rather, to only change the map database if the same report has come from several vehicles. This can also be checked by means of an editing procedure.

In summary, especially the following preferred features of the invention are being put forward:

The invention relates to a navigation method and to a navigation device 51. In the navigation method, the actual movement of the navigation device and thus of the user 5 is detected in the navigation device. In order for a prescribed destination to be reached, navigation commands are output by the navigation device 51. Signals that reflect the actual geometry 1 of the surroundings can be transmitted to the navigation device 51 by a device 25 for detecting the surroundings. If it is recognized that output navigation instructions have not been followed, then the signals that reflect the geometry of the surroundings are detected. Based on the difference between the actual movement 47 and the prescribed movement 49, an alternative navigation command 50 is determined. In comparison to the originally suggested navigation command 48, the alternative navigation command 50 constitutes a confirmation or else a correction in the direction of movement 49 suggested by the original navigation command 48.

LIST OF REFERENCE NUMERALS 1 geometry of the surroundings
3 junction/intersection
5 position of the user
13 first alternative
15 second alternative
17 third alternative
19 curved lane
21 viewing angle
25 device for detecting the surroundings
27 output of navigation command
29 deviation from the route
31 data collection
33 transmission of the data to the server
35 evaluation of the data
37 checking the navigation command
39 determination of the alternative navigation command
41 storage of the alternative navigation command
43 transmission of the alternative navigation command from the server to the navigation device
45 termination of the evaluation
47 actual movement
48 original navigation command
49 originally suggested movement
50 alternative navigation command
51 navigation device
53 control unit
57 output unit
59 entry unit
61 position detection means/GPS receiver
63 GPS satellite
65 forward-facing camera
67 backward-facing camera
69 sensor system
71 detection range of 65
73 detection range of 67
75 direction of movement
77 display
79 loudspeaker
81 stored map material
83 module
85 vehicle

The invention claimed is:

1. A navigation method comprising:
operating a navigation device with which an actual movement of the navigation device is detected and original navigation instructions for reaching a prescribed destination are output by the navigation device, whereby signals that reflect an actual geometry of surroundings are transmitted to the navigation device by a device for detecting the surroundings,
wherein the signals that reflect the actual geometry of the surroundings of an intersection are detected when a deviation from a prescribed movement by the original navigation instructions has been recognized, and based on a difference between the actual movement of the navigation device and the prescribed movement by the original navigation instructions, alternative navigation instructions that correspond with the deviation are determined, and based on a route of the navigation device when the navigation device passes the intersection again, the alternative navigation instructions are compared to the original navigation instructions and the alternative navigation instructions are confirmed or stored in the navigation device as a correction in the direction of movement suggested by the original navigation instructions.

2. The navigation method according to claim 1, wherein for the actual geometry of the surroundings, the alternative navigation instructions are stored while concurrently associating a location of the actual geometry of the surroundings.

3. The navigation method according to claim 2, wherein at the time of a next use of the alternative navigation instructions, a checking procedure is carried out to see whether the alternative navigation instructions have been followed, and if the alternative navigation instructions have not been followed, then the original navigation instructions are retained.

4. The navigation method according to claim 1, wherein the alternative navigation instructions are used for all surrounding geometries.

5. The navigation method according to claim 1, wherein image data is captured by a camera facing in a direction of the actual movement of the navigation device and is transmitted to the navigation device if the original navigation instructions are not followed.

6. The navigation method according to claim 5, wherein image data captured from a backward-facing perspective by a backward-facing camera is transmitted to the navigation device.

7. The navigation method according to claim 1, wherein image data is used for the detection of the actual geometry of the surroundings.

8. The navigation method according to claim 1, wherein image data is taken into account when the alternative navigation instructions are selected.

9. The navigation method according to claim 1, wherein the actual geometry of the surroundings is compared to a geometry of the surroundings that serves as the basis of the navigation method, which is extracted from map material stored in the navigation device, and, if there is a deviation, the actual geometry of the surroundings is stored in the navigation device.

10. The navigation method according to claim 1, wherein the actual geometry of the surroundings is captured, when the original navigation instructions have been given and there has been a deviation from a prescribed route at a point where the original navigation instructions were expected to have been followed.

11. The navigation method according to claim 1, wherein performing a checking procedure to determine if a geometry of the surroundings that serves as a basis of the instructions and that is based on map material used by the navigation device matches the actual geometry of the surroundings and storing the alternative navigation instructions in the navigation device if the geometry of the surroundings matches the actual geometry of the surroundings.

12. A navigation device, comprising
a device for detecting the surroundings having sensors for detecting the actual surrounding geometries; and
a control unit in which map material is stored and which is provided in order to process image data that has been made available, whereby navigation commands are generated by the control unit or are stored in a memory of the control unit,
wherein the navigation device comprises a module, whereby the module acquires alternative navigation commands determined according to claim 1 and stores them for further use.

13. The navigation device according to claim 12, whereby a first camera is provided as the device for detecting the surroundings to capture image data in the direction of movement and a second camera is provided as the device for detecting the surroundings to capture image data opposite to the direction of movement.

* * * * *